United States Patent
Barros et al.

(10) Patent No.: US 9,548,998 B1
(45) Date of Patent: Jan. 17, 2017

(54) ASYNCHRONOUS COMMUNICATION SYSTEM ARCHITECTURE

(71) Applicant: Expect Labs, Inc., San Francisco, CA (US)

(72) Inventors: Brett Barros, San Francisco, CA (US); Moninder Jheeta, Redmond, WA (US); George Samuel Kola, Concord, CA (US); Timothy Tuttle, San Francisco, CA (US)

(73) Assignee: Mindmeld, Inc., San Francisco, CA (US)

(*) Notice: Subject to any disclaimer, the term of this patent is extended or adjusted under 35 U.S.C. 154(b) by 627 days.

(21) Appl. No.: 13/945,868

(22) Filed: Jul. 18, 2013

Related U.S. Application Data (60) Provisional application No. 61/698,319, filed on Sep. 7, 2012.

(51) Int. Cl.
*G06F 15/16* (2006.01)
*H04L 29/06* (2006.01)
*H04L 29/08* (2006.01)

(52) U.S. Cl.
CPC ............. *H04L 65/00* (2013.01); *H04L 65/403* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 8,024,328 | B2 * | 9/2011 | Dolin | G06F 17/30867 707/706 |
| 2003/0135575 | A1 * | 7/2003 | Marejka | H04L 43/00 709/207 |
| 2006/0223593 | A1 * | 10/2006 | Ishak | H04L 29/06027 455/574 |
| 2006/0282317 | A1 * | 12/2006 | Rosenberg | G06Q 30/02 705/14.35 |
| 2010/0017455 | A1 * | 1/2010 | Svendsen | H04L 12/1818 709/202 |
| 2010/0246784 | A1 * | 9/2010 | Frazier | H04L 65/1083 379/88.13 |
| 2012/0239761 | A1 * | 9/2012 | Linner | G06F 17/2765 709/206 |

OTHER PUBLICATIONS

Dictionary.com, Definition of "participation" retrieved from Wayback Machine, p. 1-2, May 1, 2012.*

* cited by examiner

*Primary Examiner* — Joshua Joo
(74) *Attorney, Agent, or Firm* — Fenwick & West LLP (57) ABSTRACT

Data is asynchronously provided to a participant of a conversation. A temporal model is maintained for each of a plurality of client devices associated with the conversation. A temporal model describes a state of an associated client device. Data for sending to a client device is identified based on conversation context information describing a context of a conversation participant associated with the client device. A determination of whether to send the identified data to the client device is made based on the temporal model associated with the client device. The temporal model associated with the client device is updated based on the determination.

14 Claims, 7 Drawing Sheets

ASYNCHRONOUS COMMUNICATION SYSTEM ARCHITECTURE

CROSS REFERENCE TO RELATED APPLICATIONS

The application claims the benefit of Provisional Application No. 61/698,319, filed on Sep. 7, 2012, the content of which is incorporated herein by reference.

BACKGROUND

Field of Disclosure

This disclosure relates to the field of multi-party party communication, and more specifically, to the real-time synchronization, aggregation, and analysis of communication among multiple parties.

Description of the Related Art

As technological advances allow for greater simultaneous communication capabilities among parties that are not co-located, the need for the real-time analysis of communication data is increasing. Generally, for simultaneous communication (referred to herein as a "conversation"), each participant communicates using a communication device, such as a phone, a computer, a mobile device, and the like. In a typical communication setting, each participant may be located remotely from other participants, and may communicate using a different type of device than other participants. The ability to gather, synchronize, and analyze communication data in such a communication setting is hindered by the remoteness of the participants with respect to each other, and by the lack of a uniform communication device among the participants. In addition, conversations are in constant flux, with changes in topic, varying participation levels, and changes in participants occurring in real-time.

SUMMARY

The above and other issues are addressed by a method, non-transitory computer readable storage medium, and computer system for asynchronously providing data to a conversation participant. An embodiment of the method comprises maintaining a temporal model for each of a plurality of client devices associated with the conversation. A temporal model describes a state of an associated client device. Data for sending to a client device is identified based on conversation context information describing a context of a conversation participant associated with the client device. A determination of whether to send the identified data to the client device is made based on the temporal model associated with the client device. The temporal model associated with the client device is updated based on the determination.

An embodiment of the medium stores executable computer program instructions for asynchronously providing data to a conversation participant. The instructions, when executed, cause a computer to maintain a temporal model for each of a plurality of client devices associated with the conversation. A temporal model describes a state of an associated client device. The instructions identify data for sending to a client device based on conversation context information describing a context of a conversation participant associated with the client device. A determination of whether to send the identified data to the client device is made based on the temporal model associated with the client device. The instructions update the temporal model associated with the client device based on the determination.

An embodiment of the computer system for asynchronously providing data to a conversation participant includes a non-transitory computer-readable storage medium storing executable computer program instructions. The instructions cause a computer to maintain a temporal model for each of a plurality of client devices associated with the conversation. A temporal model describes a state of an associated client device. The instructions identify data for sending to a client device based on conversation context information describing a context of a conversation participant associated with the client device. A determination of whether to send the identified data to the client device is made based on the temporal model associated with the client device. The instructions update the temporal model associated with the client device based on the determination. The computer system also includes a processor for executing the computer program instructions.

DETAILED DESCRIPTION

The Figures (Figs.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
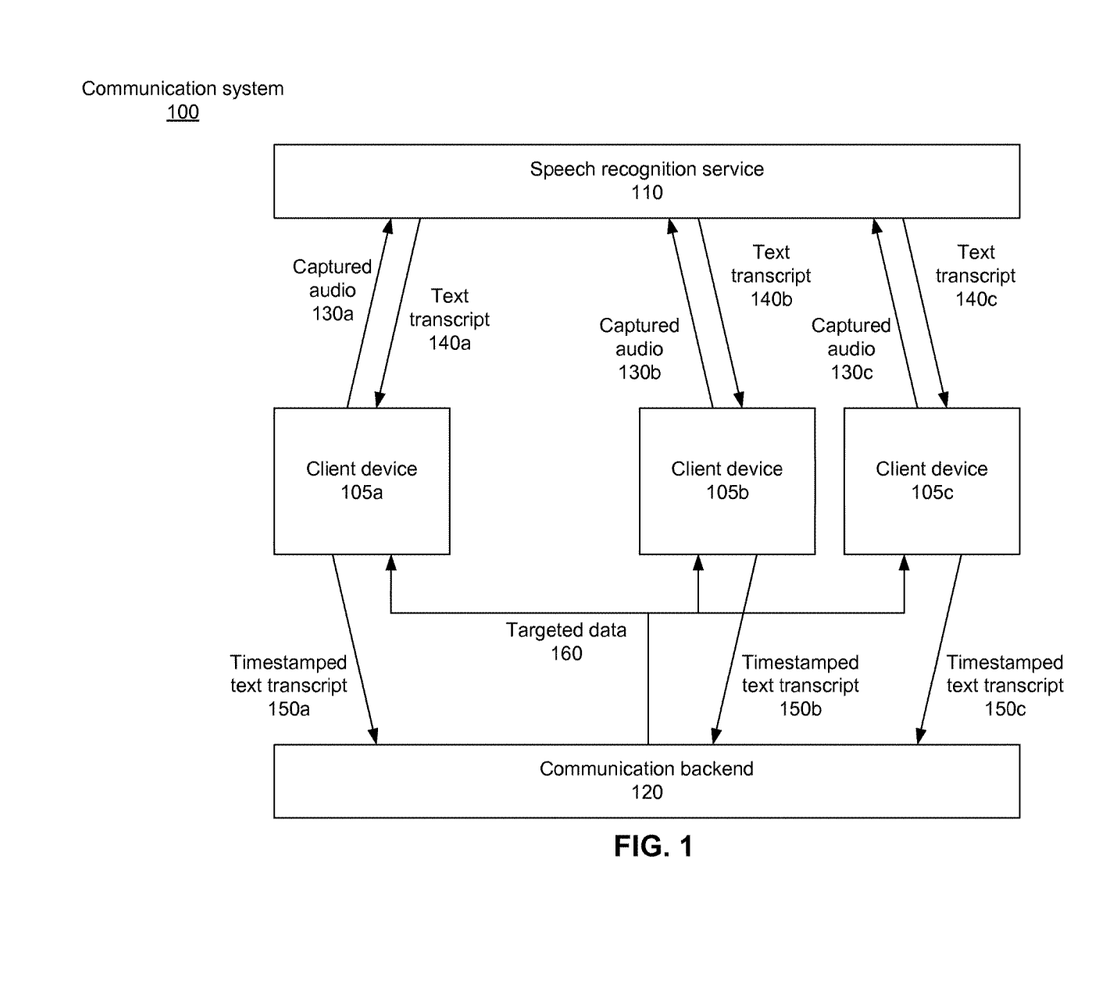
FIG. 1 is a high-level block diagram illustrating the operation of a multi-party communication synchronization system, according to one embodiment.

FIG. 1 is a high-level block diagram illustrating the operation of a multi-party communication synchronization system 100 (hereinafter "communication system 100"), according to one embodiment. FIG. 1 and the other figures describe the operation of the communication system 100 in the context of the capture and synchronization of audio communication data for the purposes of simplicity, though it should be noted that the principles described with regards to FIG. 1 apply equally to embodiments in which other types of communication data are captured and synchronized. For example, in addition to audio data, communication data captured and synchronized by the communication system can include video data, text data (such as instant messaging or email communications), action-based data (for instance, an action taken by a conversation participant with regard to a client device), or user state data (such as information describing or associated with conversation participants).

In the embodiment of FIG. 1, the communication system 100 includes a plurality of client devices (client device 105a, 105b, and 105c, collectively "client devices 105"), a speech recognition service 110, and a communication backend server 120. Although only three client devices are illustrated in the embodiment of FIG. 1, any number of users can use any number of client devices to participate in a conversation via the communication system 100. For instance, hundreds of users can participate in a conversation at once. In addition, although only one speech recognition service 110 is illustrated in the embodiment of FIG. 1, any number of speech recognition services can be used, for instance, one speech recognition service per client device 105.

Users of each client device 105 use the client device to participate in a conversation via the communication system. In one embodiment, the client devices communicate directly with the other client devices such that the device-to-device communications do not travel through the communication backend server 120. For instance, the client devices can include tablet computers equipped with microphones and running a Voice Over Internet Protocol (VOIP) application. In this embodiment, the VOIP application is configured to transmit the speech of a user of a first tablet to a second tablet for playback on speakers of the second tablet. In such an embodiment, multiple users can speak to and hear each other simultaneously and in real-time.

Each client device 105 is configured to capture audio data from the user of the particular client device, and is further configured to store, at the client device, the time at which the audio data is captured. Each client device processes and/or encrypts the captured audio, and sends the captured audio to a speech recognition service 110. For example, client devices 105a, 105b, and 105c transmit captured audio 130a, 130b, and 130c (collectively "captured audio 130"), respectively, to the speech recognition service. The speech recognition service analyzes the captured audio received from a client device, determines a text transcript representing the captured audio, and provides the text transcript to the client device. For example, the speech recognition service provides the text transcripts 140a, 140b, and 140c (collectively "text transcripts 140") to the client devices 105a, 105b, and 105c, respectively.

Upon receiving a text transcript 140 representing captured audio 130 from the speech recognition service 110, each client device 105 timestamps the text transcript with the time at which the captured audio associated with the text transcript was captured, and sends the timestamped text transcript to the communication backend 120. For example, client devices 105a, 105b, and 105c timestamp received text transcripts, and transmit the timestamped text transcripts 150a, 150b, and 150c (collectively "timestamped text transcripts 150"), respectively, to the communication backend. The communication backend synchronizes the timestamped text transcripts 150 and generates a relevance model based on the synchronized text transcripts. The communication backend then identifies relevant data targeted to the conversation among users of the client devices based on the relevance model, and provides the targeted data 160 to the client devices.

The communication backend 120 provides relevant data to the client devices 105 targeted to the communications between users of the client devices. For example, for communications involving a particular restaurant, the communication backend can provide a website, menus, prices, or ratings associated with the restaurant. Similarly, for conversations about a road trip to New Orleans, the communication backend can provide gas prices, maps, hotel information, and information about tourist attractions in New Orleans. The communication backend is configured to operate in conjunction with the client devices such that users can communicate seamlessly through the client devices and the communication backend can analyze the communications between the users in the background. Data targeted to the communications can be provided to the client devices for display on the client devices.

Figure 2:
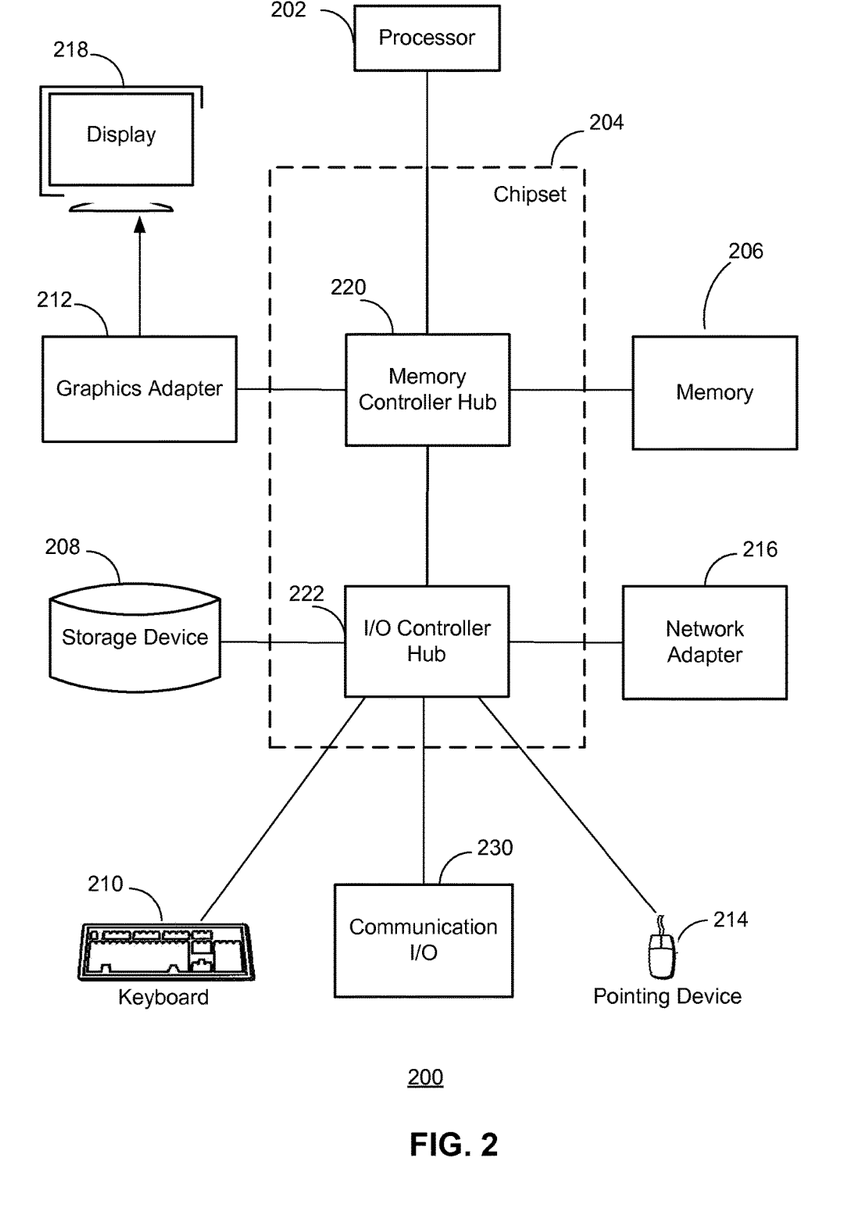
FIG. 2 is a high-level block diagram illustrating an example computer.

FIG. 2 is a high-level block diagram illustrating an example computer 200 for use as one or more of the entities of FIG. 1. The computer includes at least one processor 202 coupled to a chipset 204. The chipset includes a memory controller hub 220 and an input/output (I/O) controller hub 222. A memory 206 and a graphics adapter 212 are coupled to the memory controller hub, and a display 218 is coupled to the graphics adapter. A storage device 208, keyboard 210, pointing device 214, network adapter 216, and communication I/O 230 are coupled to the I/O controller hub. Other embodiments of the computer have different architectures.

The storage device 208 and memory 206 are non-transitory computer-readable storage mediums such as hard drives, compact disk read-only memories (CD-ROM), DVDs, or solid-state memory devices. The memory holds instructions and data used and executed by the processor 202. The pointing device 214 is a mouse, track ball, touch-sensitive display, or other type of pointing device, and is used in combination with the keyboard 210 to input data into the computer 200. The graphics adapter 212 displays images and other information on the display 218. The network adapter 216 couples the computer to one or more computer networks.

The communication I/O 230 includes devices configured to capture communication data from a user of the computer 200. For example, the communication I/O can include a microphone, a camera, a video camera, and the like. Communication data captured by the communication I/O is transmitted by the network adapter 216 via the I/O controller hub 222, is stored in the storage device 208 via the I/O controller hub, or is stored in the memory 206 via the memory controller hub 220. Prior to transmission or storage, the captured communication data can be processed by the processor 202.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, a client device 105 can be a desktop or laptop computer, a tablet computer, a mobile phone or other mobile device, a networked television or set-top box, or any other device capable of capturing communication data and communicating with the entities of FIG. 1. The speech recognition service 110 can be a computer, such as a desktop, laptop, tablet computer, or server; can be a software program executed on a computer, such as a native application on a client device, desktop, or mobile device; or can be a cloud-based application hosted on a datacenter of a web services company. The communication backend 120 can be a server (such as a blade server or web server), a datacenter, and the like. Each entity of FIG. 1 can include multiple computers, and multiple entities can be implemented in a single computer. It should be noted that some computers can lack various components described above, such as keyboards 210, graphics adapters 212, communication I/O 230, and displays 218.

Figure 3:
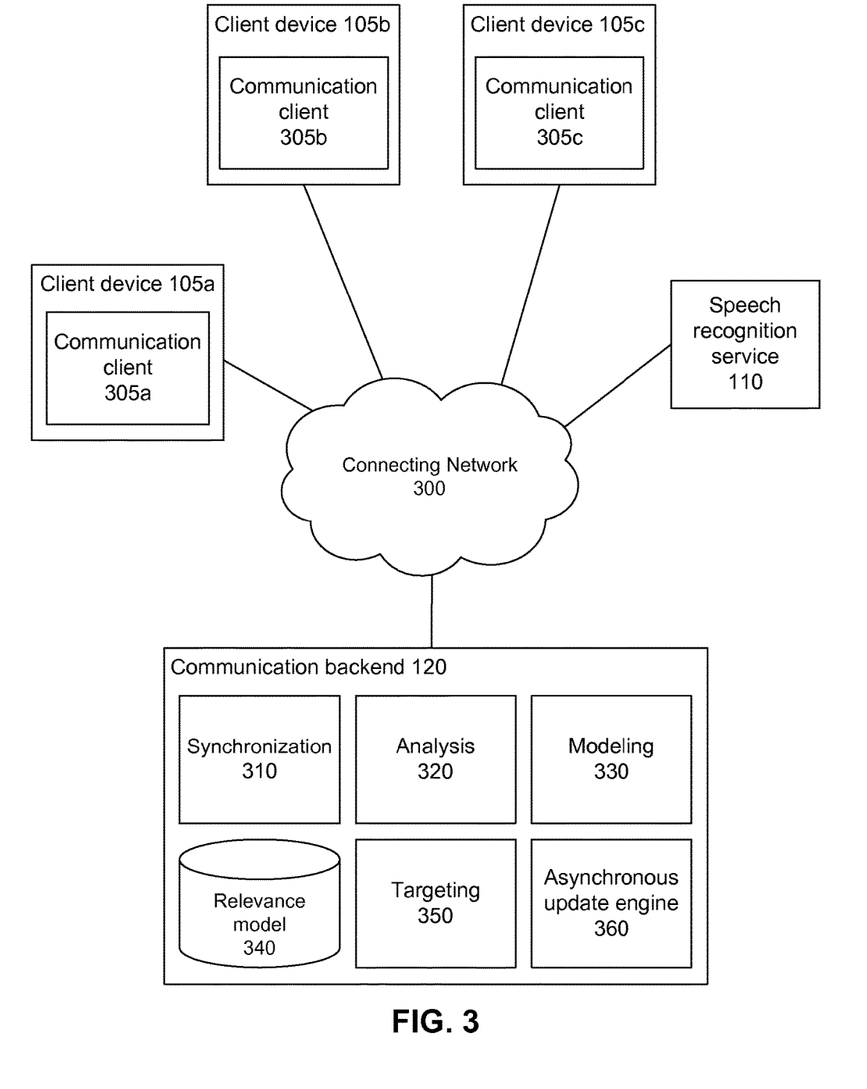
FIG. 3 is a high-level block diagram illustrating an operating environment for a multi-party communication synchronization system, according to one embodiment.

FIG. 3 is a high-level block diagram illustrating an operating environment of the multi-party communication synchronization system 100, according to one embodiment. The embodiment of FIG. 3 shows the plurality of client devices 105a, 105b, and 105c, each including a communication client 305a, 305b, and 305c (collectively "communication clients 305"). The embodiment of FIG. 3 further shows the speech recognition service 110 and the communication backend 120. The entities of FIG. 3 communicate via a connecting network 300. In other embodiments, the operating environment illustrated in FIG. 3 can include different components than those illustrated herein. For example, the speech recognition service can be implemented within each client device, for instance as an application operating on each client device, as described above.

The connecting network 300 provides a communication infrastructure between the client devices 105, the speech recognition service 110, and the communication backend 120. The connecting network is typically the Internet, but may be any network, including but not limited to a Local Area Network (LAN), a Metropolitan Area Network (MAN), a Wide Area Network (WAN), a mobile wired or wireless network, a private network, or a virtual private network. In addition, the connecting network can be an on-device network. For example, in an environment where the speech recognition service is implemented within a client device, the connecting network can include the on-device communication infrastructure between a communication client 305 on the client device and the speech recognition service on the device. In some embodiments, the connecting network includes multiple types of networks.

As discussed above, users use the client devices 105 to participate in a conversation via a communication system. A communication client 305 on a client device receives audio data from a user of the client device (for instance, speech of the user and accompanying background noise) and transmits the audio data to the communication clients on the client devices used by other participants to the conversation. A communication client on a client device can playback audio data received from other communication clients to a user of the client device. The communication client can be a native application, a web-based application, or any other entity capable of capturing, transmitting, receiving, and playing back audio data to and from other communication clients. In an example embodiment, a first client device can be a tablet computer, a second client device can be a mobile phone, a third client device can be a networked television, and the communication client on each client device can be an application that allows the users of the three client devices to speak to each other and to hear each other speak simultaneously or near-simultaneously.

The communication client 305 captures audio data from a user of a client device 105. For example, if a user of a client device says "Hi Frank, how are you", the communication client on the client device captures the audio data "Hi Frank, how are you". The captured audio data is stored in memory at the client device such as a memory buffer located at the client device. Captured audio data can be assigned an identifier, and the identifier can be stored in conjunction with the captured audio at the client device.

The communication client 305 captures audio data by sampling received analog signals associated with the audio data at a sampling rate and digitally representing the sampled audio signals. Captured audio can be stored in any format, for instance "raw"/uncompressed formats such as the pulse-code modulation (PCM) format, or compressed formats such as the MP3 format. The sampling rate at which audio data is sampled, the format used the digitally represent the audio data, and the bit depth and/or type of compression used to representing the audio data can be selected by a user of a client device 105, by the client device itself, by the communication client, or by any other entity. These sampling parameters can be selected based on network bandwidth considerations, based on the processing power of the client device, based on the requirements of the speech recognition service 110, or based on any other parameter related to the operation of the communication system 100. For example, audio data can be captured in the PCM format at a sampling rate of 16 kHz and using a bit depth of 16 bits.

The communication client 305 stores the captured audio data at the client device 105 as a series of audio frames. In one embodiment, each frame represents 20 ms of captured audio data; for captured audio data sampled at 16 KHz, each 20 ms frame represents approximately 320 individual samples of audio data. Frames are stored at the client device 105 in the order in which the audio data represented by the frames is captured. In one embodiment, the frames are indexed based on the time that each frame is captured. For example, if 50 frames of audio data are captured by the communication client 305 over the course of a user of the client device speaking, the 50 frames can be indexed with the indexes Frame_1 to Frame_50, with each successively captured frame indexed with a successive index.

The communication client can perform frame-level processing on stored audio frames. Example processing options include noise cancellation, echo cancellation, and the like. The communication client can also determine whether or not each stored audio frame includes human speech by processing each frame and analyzing whether the audio data stored in each frame includes audio signals indicative of speech. Frames containing speech can be classified by the communication client as containing speech. For example, if a frame includes captured sound representing a human voice, the communication client can classify the frame as containing speech, whereas if the frame includes captured sound associated with background or other non-voice noise, the communication client can classify the frame as not containing speech.

The communication client 305 identifies stored sequences of consecutively ordered frames based on whether the frames contain speech. Such identified sequences are referred to herein as "segments" of speech frames. Each segment includes one or more consecutively ordered frames containing audio data representing human speech. A segment of speech frames can represent a single word spoken by a user, multiple spoken words, a spoken sentence, multiple spoken sentences, or any other amount of continuous speech.

The communication client 305 can identify segments in real-time, for instance by determining if each frame contains speech as it is captured. For instance, if the communication client determines that a first captured frame contains speech, the communication client can identify the first frame as the beginning of a segment, can identify all consecutive successively captured frames containing speech as part of the segment, and can identify the last captured frame containing speech before capturing a frame not containing speech as the end of the segment.

Upon identifying segments, the communication client 305 can encode the segments. The type of encoding can be pre-determined, can be based on the encoding requirements of the speech recognition service, or can be based on the security requirements of the communication system 100 or the available bandwidth between the client device 105 and the speech recognition service. For example, the segments can be encoded into a 16-bit wide-band encrypted format in response to a determination that sufficient bandwidth is available for such a format and in response to a requirement that audio data be secure prior to transmission within the speech recognition service. Likewise, the segments can be encoded into a compressed format to reduce the amount of bandwidth required to send the segments in response to a determination that only limited bandwidth is available. Segments can be encoded individually, frame-by-frame, or can be concatenated together into a segment package and encoded together.

The communication client 305, in conjunction with capturing audio data from a user of the client device 105, also stores time data representing the time at which the audio data is captured. The communication client 305 associates the captured audio data with the stored time representing the captured audio data. For example, if a user of a client device says "Hi Claire, this is Jason" at 12:40:00 pm PST, the communication client on the client device associates the time [hours=12, minutes=40, seconds=00, am/pm=pm, time zone=PST] with the captured audio data representing the speech "Hi Claire, this is Jason". The association between stored time data and captured audio data can be made in a table stored at the client device that maps identifiers for audio data to time data representing the audio data. Time data can be associated with individual frames of audio data, with segments of audio data, with audio data representing a speech turn, with audio data representing an entire conversation, or with any other subset of audio data. It should be noted that time can be stored in any format with the audio data. In addition, it should be noted that a start time may be stored with a first frame in a first segment of audio data, and that time data associated with subsequent frames or segments may be determined by adding to the start time a time delta representing a known length of time associated with frames or segments.

The communication client 305 sends the identified segment to the speech recognition service 110. Alternatively, the communication client can identify multiple segments prior to sending any segments to the speech recognition service, for instance in order to identify segments comprising an entire speech turn of a user. The communication client can simultaneously send the multiple segments to the speech recognition service. The multiple segments can be sent to the speech recognition service in response to a threshold number of unsent segments being identified, in response to a threshold amount or percentage of memory or storage space at the client device 105 being filled by the identified segments, in response to the passage of a threshold amount of time since a previous segment was sent, in response to a determination that a user of the client device has paused or finished speaking, or in response to any other suitable factor.

The speech recognition service 110, upon receiving one or more segments of audio data, converts the received audio data into a text transcript of the received audio data. In one embodiment, the speech recognition service makes a text hypothesis for each word with the received audio data, which is a guess of a text transcript representing the word in the audio data of the received segments. The speech recognition service uses a speech recognition engine to process the received audio data and identify one or more words contained in the audio data. Words can be identified in the received audio data by comparing the received audio data to audio data representing known words. Words in the audio data are identified at a particular estimation of confidence. For instance, the speech recognition engine can process a first portion of audio data, and can identify the word "tree" in the first portion with a 90% confidence that the identification is correct, can identify the word "three" in the first portion with a 50% confidence, and can identify the word "free" in the first portion with a 30% confidence. Text hypotheses thus are combinations of a text transcript of an identified word and an estimated confidence that the word is identified in the text transcript correctly. Note that multiple text hypotheses can be made for each word within the received audio data.

The speech recognition service 110 produces one or more text hypotheses for each spoken word contained within the audio data of the received one or more segments. For each spoken word, the speech recognition service selects the text hypothesis associated with the highest estimated confidence. The speech recognition service combines the text associated with the selected text hypotheses to form a text transcript of the received audio data. The speech recognition service outputs the text transcript of the received audio data to the communication client 305 from which the corresponding audio data was received.

Upon receiving the text transcript of the one or more segments of audio data from the speech recognition service 110, the communication client 305 timestamps the text transcript with the time data associated with the corresponding audio data. As noted above, the communication client stores time data and associates the time data with audio data captured by the communication client. Thus, for one or more segments of audio data sent by the communication client to the speech recognition service, the communication client stores time data associated with the one or more segments of audio data. Upon receiving a text transcript of the one or more segments of audio data back from the speech recognition service, the communication client accesses the stored time data associated with the one or more segments of audio data. The accessed time data is used to timestamp the received text transcript. As used herein, "timestamping" refers to the association of time data and a text transcript. In one embodiment, timestamping includes the packaging of time data and a text transcript into a text transcript data structure. The time data in a timestamped text transcript represents the time at which the audio data represented by the text transcript was captured. The communication client sends the timestamped text transcript to the communication backend 120. It should be noted that in other embodiments, the timestamped text transcripts can include additional data, such as an identifier for the client device that captured the audio data, the identity of a user of the client device, information associated with a user context of the user, and the like.

The communication backend 120 receives timestamped text transcripts from one or more communication clients 305 via the connecting network 300. The communication backend can continuously receive timestamped text transcripts from the client devices 105 throughout the course of a conversation. For instance, every time a user of a client device speaks in a conversation, the communication client of the client device of the user can capture audio data from that user's speech, can send one or more segments of the captured audio data to the speech recognition service 120, can receive a text transcript from the speech recognition service, can timestamp the text transcript, and can send the timestamped text transcript to the communication backend. During the course of a conversation, this process can occur hundreds or thousands of times per client device.

In response to receiving the timestamped text transcripts during a conversation, the communication backend 120 synchronizes and analyzes the received timestamped text transcripts, generates a relevance model based on the synchronized and analyzed received timestamped text transcripts, and provides relevant data targeted to the conversation and based on the relevance model to the client devices. The communication backend includes a synchronization module 310, an analysis module 320, a modeling module 330, a relevance model storage module 340, a targeting module 350, and an asynchronous update engine 360 for performing these tasks. In other embodiments, the communication backend includes different, additional, or fewer modules than those described herein.

The synchronization module 310 synchronizes timestamped text transcripts received from a plurality of client devices 105 based on the time data associated with the timestamped text transcripts. In one embodiment, the synchronization module synchronizes the text transcripts in real time, as the transcripts are received. Synchronizing timestamped text transcripts includes ordering the timestamped text transcripts chronologically. For example, assume the communication backend receives the following timestamped text transcripts (each including a text transcript and a time) from a conversation between two participants:

| Text Transcript | Time |
| --- | --- |
| Sounds like fun | 5:23:29 pm PST |
| Hello | 5:23:09 pm PST |
| Hi Sam | 5:23:06 pm PST |
| Pretty good just got back from the baseball game | 5:23:24 pm PST |
| How are you doing | 5:23:15 pm PST |

The synchronization module 310 can re-order the timestamped text transcripts as follows:

| Text Transcript | Time |
| --- | --- |
| 1 Hi Sam | 5:23:06 pm PST |
| 2 Hello | 5:23:09 pm PST |
| 3 How are you doing | 5:23:15 pm PST |
| 4 Pretty good just got back from the baseball game | 5:23:24 pm PST |
| 5 Sounds like fun | 5:23:29 pm PST |

It should be noted that the synchronization of text transcripts by the time data associated with the text transcripts can be more accurate than merely ordering timestamped text transcripts based on the times that the timestamped text transcripts are received at the communication backend 120, as the time of receipt of the timestamped text transcripts can be delayed. For instance, the communication clients 305 can delay sending one or more timestamped text transcripts, or network delay in the connecting network 300 can delay the delivery of one or more timestamped text transcripts. As the communication backend receives additional timestamped text transcripts resulting from a conversation, the synchronization module 310 continually synchronizes the timestamped text transcripts. In one embodiment, the synchronization module synchronizes the timestamped text transcripts in real-time, as the text transcripts are received from the client devices 105.

The analysis module 320 analyzes the synchronized text transcripts to identify conversation parameters. Conversation parameters describe attributes or characteristics of the conversation being conducted by users of the client device, and include important or frequently occurring words or phrases within the synchronized text transcripts identified by the analysis module. For instance, the analysis module can identify frequently occurring nouns and noun phrases, or verbs and verb phrases. In addition, the analysis module may identify terms associated with brands, products, services, or other commercial interests. In one embodiment, the analysis module analyzes the synchronized text transcripts to identify terms that appear in a table of terms determined to be important, for instance terms bid on by advertisers.

Conversation parameters can also include parameters other than words that appear in the synchronized text transcript. For instance, the conversation parameters can include a determined topic of the synchronized text, the moods of the participants of the conversation associated with the synchronized text, the relationship between the participants of such a conversation, a level of affinity between the participants of such a conversation, the context of each participant, characteristics of each participant, and the like. Such conversation parameters can be determined based on an analysis of the types and frequency of words used in the conversation, the characteristics or information associated with conversation participants (for instance, information from social networking system or communication program accounts of the conversation participants), and the like. For example, if terms associated with baseball occur frequently in a conversation, the analysis module 320 can determine that a first conversation parameter, the conversation topic, is "baseball." Similarly, if two participants in the conversation are associated as family members within a social networking system, the analysis module can determine that a second conversation parameter, the relationship between the two participants, is "family members." As the synchronization module synchronizes additional timestamped text transcripts resulting from a conversation, the analysis module 320 continually analyzes the additional synchronized text transcripts, for instance in real-time, to identify additional conversation parameters.

The modeling module 330 generates a relevance model based on the conversation parameters identified by the analysis module 320. The relevance model describes the relative importance of the conversation parameters to the conversation. In one embodiment, the relevance model assigns weights to some or all of the conversation parameters, with a greater weight indicating a greater relevance. In one embodiment, the relevance model weights terms within the identified conversation parameters based on the frequency of occurrence of the terms within the conversation, based on the identity or characteristics of any conversation participant, based on the type of client devices used within the conversation, based on the importance of the terms to advertisers, based on the importance of each type of conversation parameter, or based on any other aspect of the conversation. The relevance model can also weight conversation parameters based on other conversation parameters. For example, if the topic of the conversation is determined to be rock climbing, terms related to rock climbing can be weighted higher relative to terms not related to rock climbing. Likewise, if two conversation participants are engaged, terms related to engagements or weddings can be weighted higher relative to terms not related to engagements or weddings. The modeling module can update the relevance model in real time as additional text transcripts are received, synchronized, and analyzed at the communication backend 120. The relevance model is stored in the relevance model storage module 340.

The targeting module 350 selects data targeted to the conversation based on the relevance model stored at the relevance model storage module 340. Targeted data can include information, communication or other client device functionality, advertisements, and the like. Targeted data can be selected based on the conversation parameters determined in the relevance model to be most relevant to the conversation. For example, if the most relevant term within the relevance model is "surfing", the targeting module can select an ad associated with surfing conditions, a map of nearby surfing locations, directions to a surf shop, and the like. The targeted data can be selected based additionally on the identities or characteristics of the users of the client devices 105, based on a current speaker in a conversation, or based on any other conversation parameter. In one embodiment, the targeted data selected by the targeting module 350 is the data determined to be the most relevant to the conversation based on the relevance model.

Targeted data is provided by the targeting module 350 to the communication clients 305 via the asynchronous update engine 360. In one embodiment, the targeting module selects targeted data to provide to all communication clients. Alternatively, the targeting module can select targeted data individually for each communication client. The asynchronous update engine can provide targeted data to the communication clients periodically, in response to a user action, in response to the passage of a threshold amount of time since targeted data was last provided to the communication clients, based on a temporal model maintained by the asynchronous update engine for each client, or based on any other suitable criteria. The asynchronous update engine is described below in greater detail. The communication clients can display selected targeted data to a user of the client device 105, for instance within a communication client interface.

Although the embodiment of FIG. 3 is described herein with reference to the capture, synchronization, and analysis of audio data, it should be noted that the principles described herein apply to other types of communication data as well. For example, the communication clients 305 can capture video data, and a video recognition service (not illustrated) can identify video characteristics (such as facial expressions, face, gesture, and object recognition, and the like). The video characteristics can be synchronized and analyzed by the communication backend 120, and conversation parameters based on the video characteristic analysis can be used to generate and/or update the relevance model. Similarly, other forms of communication data, such as text communication or action-based communication, and non-communication forms of data, such as user context information, can be synchronized, analyzed, and used to generate and/or update the relevance model.

Figure 4:
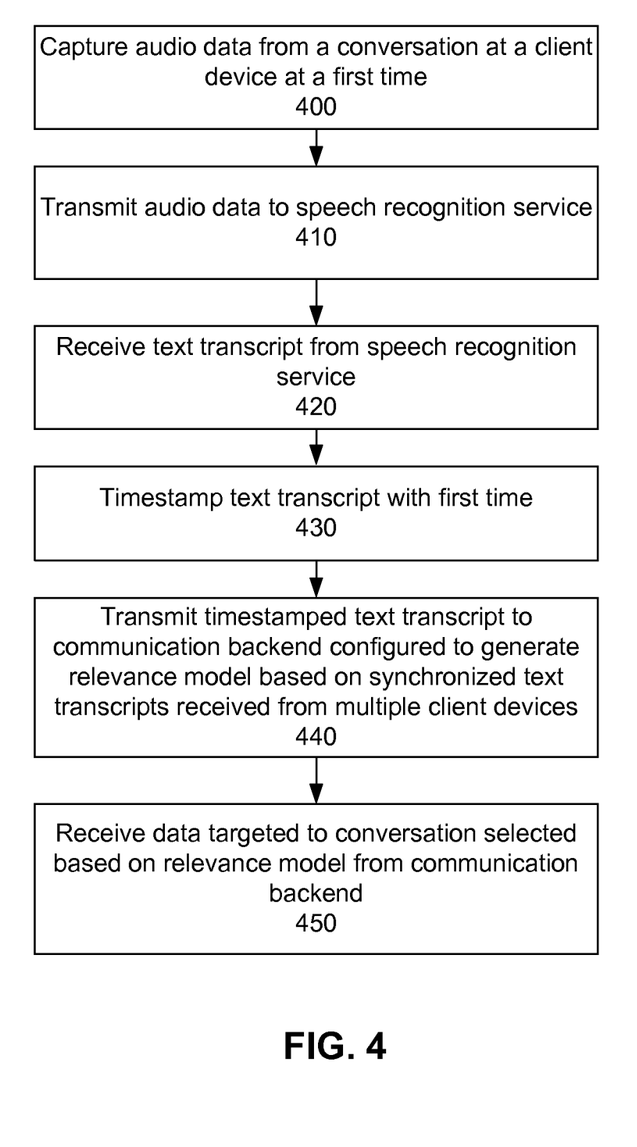
FIG. 4 is a flow chart illustrating a process for providing audio communication data to a communication backend for synchronization and analysis, according to one embodiment.

FIG. 4 is a flow chart illustrating a process for providing audio communication data to a communication backend for synchronization and analysis, according to one embodiment. Audio data is captured 400 at a client device at a first time. The audio data originates from a conversation participant in a conversation between one or more other conversation participants. The audio data is transmitted 410 to a speech recognition service. In response, a text transcript of the audio data is received 420 from the speech recognition service.

The text transcript is timestamped 430 with the first time. The timestamped text transcript is transmitted 440 to a communication backend. The communication backend is configured to generate a relevance model based on a synchronization of text transcripts received from multiple other client devices. For example, the multiple client devices can include one or more client devices used by other participants in the conversation, and the text transcripts can represent audio data captured at those other client devices (for instance, in response to speech from the other participants). Data targeted to the conversation and selected based on the relevance model is received 450 from the communication backend. The targeted data can include, for example, information associated with the conversation.

Figure 5:
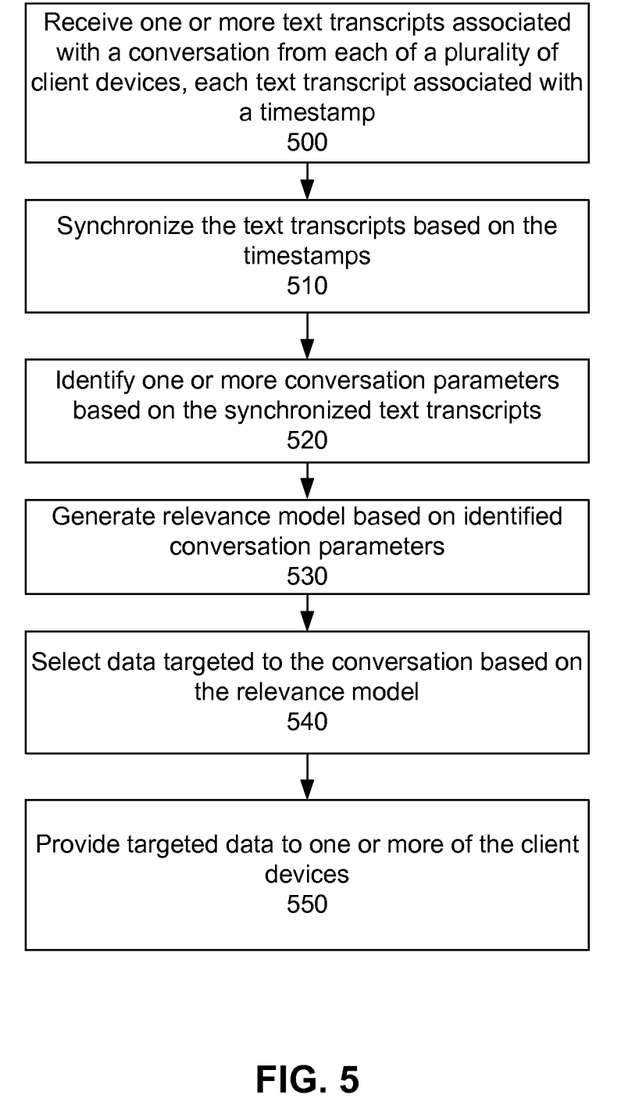
FIG. 5 is a flow chart illustrating a process for providing data targeted to a conversion to one or more client devices, according to one embodiment.

FIG. 5 is a flow chart illustrating a process for providing data targeted to a conversion to one or more client devices, according to one embodiment. Text transcripts are received 500 from client devices used by conversation participants to communicate with each other. Each text transcript is associated with a timestamp based on the time communication data associated with the text transcript was captured. The text transcripts are synchronized 510 based on the timestamps. For instance, the text transcripts are ordered, with each text transcript placed in the order based on the timestamp associated with the text transcript.

One or more conversation parameters are identified based on the synchronized text transcripts. Conversation parameters can include keywords, topics, relationships between conversation participants, and the like. A relevance model is generated 530 based on the identified conversation parameters. The relevance model describes the relative importance of the conversation parameters to the conversation. Data targeted to the conversation is selected 540 based on the relevance model, and is provided 550 to the one or more client devices. For instance, if the relevance model determines that a particular sports team is important to the conversation, information associated with the sports team, such as the team's record, roster, ticket sales information, and the like, are provided to the client devices for access and interaction by the conversation participants.

Figure 6:
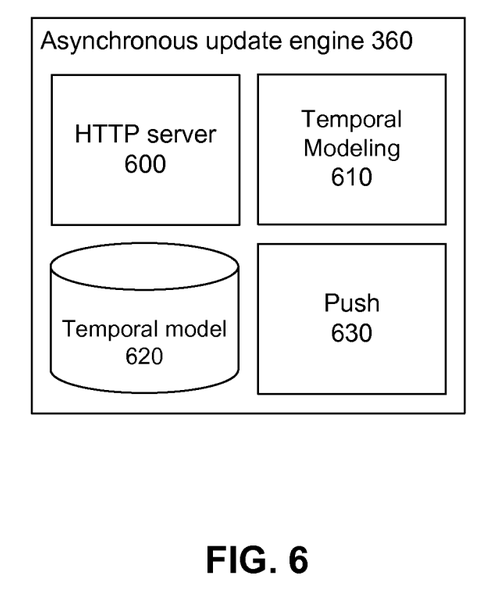
FIG. 6 is a block diagram illustrating an asynchronous update engine, according to one embodiment.

FIG. 6 is a block diagram illustrating an asynchronous update engine, according to one embodiment. The asynchronous update engine 360 maintains a temporal model for each communication client involved in a conversation, and provides data to each communication client based on the temporal models. As illustrated in the embodiment of FIG. 6, the asynchronous update engine includes an HTTP server 600, a temporal modeling module 610, a temporal model storage module 620, and a push module 630. Other embodiments of the asynchronous update engine include different components.

The HTTP server 600 provides a communicative interface between the communication backend 120 (via the asynchronous update engine 360) and each communication client 305 for data sent from the communication backend to the communication clients. The HTTP server can be a software or hardware web server, and is configured to send data provided or identified by the push module 630 to one or more indicated communication clients via the connecting network 300.

The temporal modeling module 610 generates temporal models for each of the communication clients 305 used to participate in a conversation via the communication system 100. The temporal modeling module can generate a temporal model associated with each communication client, or can generate a temporal model associated with multiple communication clients. The temporal modeling module stores generated temporal models in the temporal model storage module 620. In one embodiment, when a communication client joins a conversation via the communication system, the temporal modeling module queries the temporal model storage module for a temporal model associated with the communication client. If the temporal model storage module is not storing a temporal model associated with the communication client, then the temporal modeling module generates a temporal model for the communication client. Alternatively, if the temporal model storage module is storing a temporal model associated with the communication client, then the temporal modeling module retrieves the temporal model associated with the communication client for use in sending data to the communication client. The temporal modeling module can generate a unique identifier for each generated temporal model, and can store the unique identifier in conjunction with the temporal model for use in subsequent retrieval of the temporal model.

The temporal models generated by the temporal modeling module 610 describe the state of each communication client. A temporal model associated with a communication client 305 can describe one or more of the last data sent to the communication client from the communication backend 120, the last data received from the communication client, and data to be sent to the communication client (such as data determined to be relevant to the communication client or the user of the communication client that has not been sent to the communication client). In one embodiment, temporal models can include queues of data to send to the communication clients. The temporal models can also describe an operating mode of a communication client, such as a "capturing data" mode, a "processing data" mode, a "sending data" mode, a "receiving data" mode, a "power save" mode, and the like.

Temporal models can also describe a client device state for the client device 105 on which the communication client 305 is stored. For instance, a temporal model can describe an activity state of a client device, for instance indicating whether the client device is receiving communication data from a user of the client device, sending communication data to a speech recognition service 100, receiving communication data from a speech recognition service, sending time-stamped text transcripts to the communication backend 120, and receiving data from the communication backend. In addition, a temporal model can describe an operating mode of a client device, for instance an "idle" mode, a "receiving data" mode, a "sending data" mode, a "power save" mode, and the like.

In one embodiment, the mode of a first client device can control the modes of other client devices. For instance, if the temporal model associated with a first client device indicates that the first client device is in a "control" mode or a "share data" mode, the temporal models associated with other client devices can be updated to indicate that the other client devices are in a "receive data" mode. In this example, the communication backend, upon determining via the temporal model associated with the first client device that the first client device is in the control mode, can update the temporal models of other client devices to indicate that the other client devices are in the receive data mode. Continuing with this example, the communication backend can receive data from the client device, can identify the client devices in the receive data mode, and can forward the received data to the identified client devices. In addition, if the communication backend determines that no client device within the conversation is in control mode, the communication backend can prevent any other client device from being in a receive data mode.

Temporal models can also describe a user state for the communication client 305. For instance, a temporal model can describe that a user of a communication client is logged into or out of the communication client, is idle, or is actively or passively participating in a conversation. Temporal models can also describe a network state for the connecting network 300. For instance, a temporal model can describe the available bandwidth of the connecting network, the congestion level of the connecting network, or a communication delay within the connecting network.

The temporal modeling module 610 can update temporal models based on a change of state within the communication system 100. For a temporal model describing the state of a communication client 305 on a communication device 105 operated by a user, the temporal modeling module can update the temporal module based on a change of state of the communication client, the communication device, the user, the communication backend 120, or the connecting network 300. Such a temporal model can be updated to reflect any data sent to or received from the communication, to reflect any operating mode change for the communication client or the communication device, to reflect any activity state change of the client device, to reflect any user state change of the user, to reflect any network state change of the connecting network, or to reflect any other state change for any communication system entity.

The push module 630 asynchronously sends data to communication clients 305 via the http server 600 based on temporal models associated with each client. In one embodiment, the targeting module 350 identifies data to be sent to one or more communication clients as described above. Such identified data can include data targeted to a conversation between users of the communication clients. The targeted module can also identify one or more communication clients intended to receive the identified data.

The push module 630 sends data identified by the targeting module 350 to one or more communication clients 305 identified by the targeting module based on the temporal models associated with the one or more communication clients. The push module retrieves a temporal model associated with an identified communication client, and makes a determination of whether to send identified data based on the temporal model. For example, the push module can determine not to send the identified data based on the temporal model, for instance if the temporal model indicates that the communication client is currently busy capturing communication data, that the client device 105 on which the communication client operates is idle, that a user of the communication client has logged out of the communication client, that the connecting network 300 is congested, that data has not be received from the communication client in over a threshold amount of time, that data of a higher priority is queued to be sent to the communication client, or in response to any other state described by the temporal model that indicates that the identified data should not be immediately sent. In the event that the push module determines not to send the identified data based on the temporal model of this example, the temporal modeling module 610 can update the temporal model to reflect the determination not to send the identified data (for instance, by adding the identified data to a queue of data to be sent to the communication client associated with the temporal model).

Alternatively, the push module 630 can determine to immediately send data identified by the targeting module 350 to one or more identified communication clients 305. For example, the push module can determine to immediately send identified data to an identified communication client if the temporal model associated with the communication client indicates that the communication client is not currently sending or receiving data, that the user of the communication client is logged in to the communication client and active, that the client device 105 on which the communication client operates is not busy, that the connecting network 300 has available bandwidth with which to send data, that a data queue associated with the communication client does not contain higher priority data, or in response to any other state described by the temporal model that indicates that the identified can be immediately sent to the communication client. In the event that the push module determines to send the identified data based on the temporal model of this example, the temporal modeling module 610 can update the temporal model to reflect the determination to send the identified data (for instance, to indicate that the identified data has been sent and the time at which the identified data was sent).

The push module 630 can identify and send queued data to one or more communication clients 305 based on the temporal models associated with the communication clients. For instance, if a temporal model includes a queue of data to be sent to a communication client associated with the temporal model, the push module can identify data in the queue, and can send the identified data to the communication client. Queued data can be sent by the push module based on the priority of the queued data, the order in which the data was added to the queue, or based on any other factor. Queued data can be sent to a communication client by the push module based on the temporal model associated with the communication client. For example, the temporal model can indicate an above-threshold available bandwidth within the connecting network 300, and the push module can send queued data in response to the available bandwidth. The push module can continually monitor temporal models associated with communication clients to determine whether data is queued to be sent to the communication clients and to determine the state of communication system entities. Alternatively, the push module can query temporal models in response to a change in the temporal models by the temporal modeling module 610. In response to the sending of queued data to a communication client by the push module, the temporal modeling module can update a temporal model associated with the communication client (for instance to indicate that the queued data has been sent to the communication client).

Figure 7:
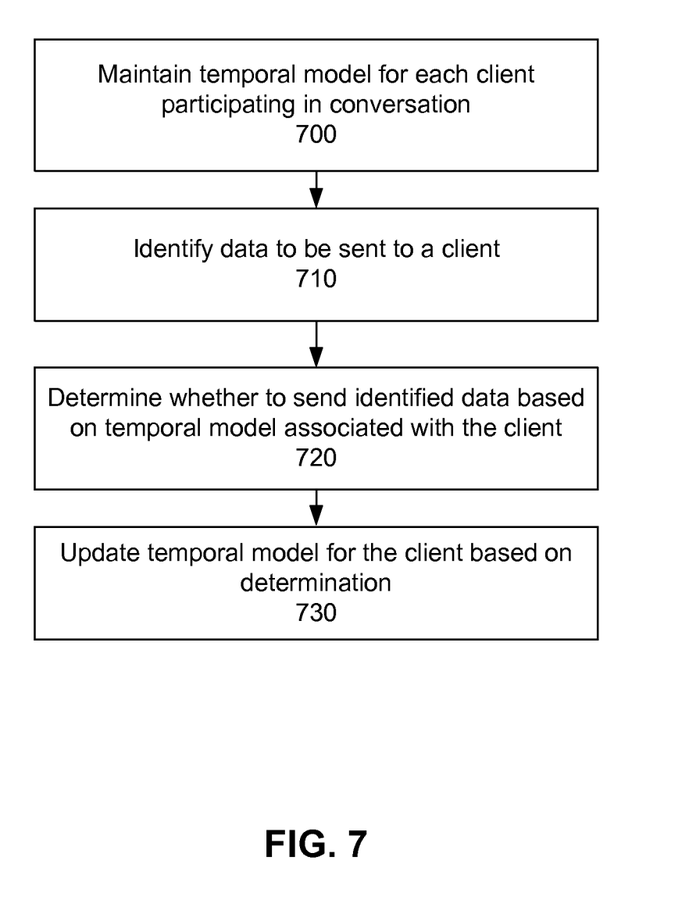
FIG. 7 is a flow chart illustrating a process for asynchronously providing data to clients, according to one embodiment.

FIG. 7 is a flow chart illustrating a process for asynchronously providing data to clients, according to one embodiment. A temporal model is maintained 700 for each communication client participating in a conversation. When a communication client first joins a conversation, a temporal model describing the state of the communication client can be created and stored if a temporal model associated with the communication client does not exist. If a temporal model associated with the communication client does exist, then the temporal model can be retrieved upon the joining of the conversation by the communication client.

Data to be sent to a communication client is identified 710. The data to be sent to the communication client can be data targeted to the communication client based on the conversation. A determination of whether or not to send the identified data is made 720 based on the temporal model associated with the communication client. For example, if the temporal model indicates that higher priority data is queued to be sent to the communication client, a determination can be made to not send the identified data. Alternatively, if the temporal model indicates that the communication client is able to receive data, a determination can be made to send the identified data. The temporal model is updated 730 based on the determination. For example, if a determination is made to not send the identified data, the identified data can be added to a data queue within the temporal model associated with the communication client. Likewise, if a determination is made to send the identified data, the temporal model can be updated to indicate that the identified data has been sent.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for an asynchronous communication system architecture. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for asynchronously providing data to conversation participants, comprising:
    establishing, by a central server, a communicative interface between the central server and each of a plurality of client devices associated with the conversation participants, wherein the central server comprises a hardware HTTP server, wherein, for each client device, the communication interface between the client device and the central server is maintained by the central server for the duration of the associated conversation participant's participation in a conversation, wherein each client device is configured to display a conversation interface, and wherein each client device is configured to display data associated with the conversation and received from the central server within the conversation interface;
    maintaining, by the central server, an associated temporal model describing a state of each of the plurality of client devices associated with the conversation and describing a user state of each of the conversation participants associated with the conversation, each user state indicating whether or not a corresponding conversation participant is actively participating in the conversation;
    identifying, by the central server, data to be sent to a first client device of the plurality of client devices based on conversation context information describing a context of a conversation participant associated with the first client device within the conversation;
    determining, by the central server, whether to send the identified data to the first client device based on a measure of participation in the conversation by a user of the first client device described by the temporal model associated with the first client device;
    in response to determining that the user state described by the temporal model of a conversation participant associated with the first client device indicates that the conversation participant is not actively participating in the conversation, queuing the identified data within a queue of the central server associated with the first client device;
    in response to determining that the user state described by the temporal model of the conversation participant associated with the first client device indicates that the conversation participant is actively participating in the conversation, sending, by the central server, the identified data to the first client device configured to display the identified data within the conversation interface of the first client device; and
    updating, by the central server, the temporal model associated with the first client device.

2. The computer-implemented method of claim 1, wherein identifying data to be sent to the first client device comprises identifying data in the queue associated with the first client device.

3. The computer-implemented method of claim 2, wherein identifying data in the queue of data comprises identifying highest priority data in the queue of data.

4. The computer-implemented method of claim 1, wherein the temporal model includes a status of each of the plurality of client devices, each status indicating if a client device is available to receive data.

5. The computer-implemented method of claim 4, wherein determining to send the identified data to the first client device based on the temporal model comprises determining to send the identified data to the first client device if the status of the first client device included in the temporal model indicates that the first client device is available to received data.

6. A non-transitory computer-readable storage medium storing executable computer program instructions for asynchronously providing data to conversation participants, the instructions, when executed by a processor of a central server, configured to perform steps comprising:
    establishing, by the central server, a communicative interface between the central server and each of a plurality of client devices associated with the conversation participants, wherein the central server comprises a hardware HTTP server, wherein, for each client device, the communication interface between the client device and the central server is maintained by the central server for the duration of the associated conversation participant's participation in a conversation, wherein each client device is configured to display a conversation interface, and wherein each client device is configured to display data associated with the conversation and received from the central server within the conversation interface;
    maintaining, by the central server, an associated temporal model describing a state of each of the plurality of client devices associated with the conversation and escribing a user state of each of the conversation participants associated with the conversation, each user state indicating whether or not a corresponding conversation participant is actively participating in the conversation;
    identifying, by the central server, data to be sent to a first client device of the plurality of client devices based on conversation context information describing a context of a conversation participant associated with the first client device within the conversation;
    determining, by the central server, whether to send the identified data to the first client device based on the measure of participation in the conversation by a user of the first client device described by the temporal model associated with the first client device;
    in response to determining that the user state described by the temporal model of a conversation participant associated with the first client device indicates that the conversation participant is not actively participating in the conversation, queuing the identified data within a queue of the central server associated with the first client device;
    in response to determining that the user state described by the temporal model of the conversation participant associated with the first client device indicates that the conversation participant is actively participating in the conversation, sending, by the central server, the identified data to the first client device configured to display the identified data within the conversation interface of the first client device; and updating, by the central server, the temporal model associated with the first client device.

7. The computer-readable storage medium of claim 6, wherein identifying data to be sent to the first client device comprises identifying data in the queue associated with the first client device.

8. The computer-readable storage medium of claim 7, wherein identifying data in the queue of data comprises identifying highest priority data in the queue of data.

9. The computer-readable storage medium of claim 6, wherein the temporal model includes a status of each of the plurality of client devices, each status indicating if a client device is available to receive data, and wherein determining to send the identified data to the first client device based on the temporal model comprises determining to send the identified data to the first client device if the status of the first client device included in the temporal model indicates that the first client device is available to received data.

10. A central server for asynchronously providing data to a participant of a conversation, comprising:
a non-transitory computer readable storage medium storing executable computer program instructions comprising instructions for:
establishing, by the central server, a communicative interface between the central server and each of a plurality of client devices associated with a plurality of conversation participants, wherein the central server comprises a hardware HTTP server, wherein, for each client device, the communication interface between the client device and the central server is maintained by the central server for the duration of the associated conversation participant's participation in the conversation, wherein each client device is configured to display a conversation interface, and wherein each client device is configured to display data associated with the conversation and received from the central server within the conversation interface;
maintaining, by the central server, an associated temporal model describing a state of each of the plurality of client devices associated with the conversation and describing a user state of each of the conversation participants associated with the conversation, each user state indicating whether or not a corresponding conversation participant is actively participating in the conversation;
identifying, by the central server, data to be sent to a first client device of the plurality of client devices based on conversation context information describing a context of a conversation participant associated with the first client device within the conversation;
in response to determining that the user state described by the temporal model of a conversation participant associated with the first client device indicates that the conversation participant is not actively participating in the conversation, queuing the identified data within a queue of the central server associated with the first client device;
in response to determining that the user state described by the temporal model of the conversation participant associated with the first client device indicates that the conversation participant is actively participating in the conversation, sending, by the central server, the identified data to the first client device configured to display the identified data within the conversation interface of the first client device; and
updating, by the central server, the temporal model associated with the first client device; and
a processor for executing the computer program instructions.

11. The central server of claim 10, wherein identifying data to be sent to the first client device comprises identifying data in the queue associated with the first client device.

12. The central server of claim 11, wherein identifying data in the queue of data comprises identifying highest priority data in the queue of data.

13. The central server of claim 10, wherein the temporal model includes a status of each of the plurality of client devices, each status indicating if a client device is available to receive data.

14. The central server of claim 13, wherein determining to send the identified data to the first client device based on the temporal model comprises determining to send the identified data to the first client device if the status of the first client device included in the temporal model indicates that the first client device is available to received data.

* * * * *

UNITED STATES PATENT AND TRADEMARK OFFICE
CERTIFICATE OF CORRECTION

| | |
|---|---|
| PATENT NO. | : 9,548,998 B1 |
| APPLICATION NO. | : 13/945868 |
| DATED | : January 17, 2017 |
| INVENTOR(S) | : Brett Barros et al. |

It is certified that error appears in the above-identified patent and that said Letters Patent is hereby corrected as shown below:

In the Claims

Claim 5, Column 18, Line 15, delete "received data" and insert --receive data--.

Claim 6, Column 18, Line 38, delete "escribing" and insert --describing--.

Claim 14, Column 20, Line 42, delete "received data" and insert --receive data--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*